US011038820B2

United States Patent
Veiga

(10) Patent No.: US 11,038,820 B2
(45) Date of Patent: *Jun. 15, 2021

(54) REMOTE LATENCY ADJUSTMENT

(71) Applicant: Comcast Cable Communications, LLC, Philadelphia, PA (US)

(72) Inventor: Anthony Manuel Veiga, Mount Holly, NJ (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/388,932

(22) Filed: Dec. 22, 2016

(65) Prior Publication Data

US 2017/0302597 A1     Oct. 19, 2017

Related U.S. Application Data

(63) Continuation of application No. 13/836,104, filed on Mar. 15, 2013, now Pat. No. 9,565,139.

(51) Int. Cl.
    *H04L 12/861*    (2013.01)
    *H04L 12/853*    (2013.01)
    *H04L 12/835*    (2013.01)

(52) U.S. Cl.
    CPC ...... *H04L 49/9005* (2013.01); *H04L 47/2416* (2013.01); *H04L 47/30* (2013.01)

(58) Field of Classification Search
    CPC .... H04L 49/9005; H04L 47/30; H04L 47/241
    See application file for complete search history.

(56) References Cited

U.S. PATENT DOCUMENTS

| | | | | |
|---|---|---|---|---|
| 5,732,239 A | * | 3/1998 | Tobagi | G06F 3/061 348/E5.008 |
| 6,744,767 B1 | | 6/2004 | Chiu et al. | |
| 6,987,731 B2 | * | 1/2006 | Shimada | H04L 47/10 370/235 |
| 7,103,008 B2 | | 9/2006 | Greenblat et al. | |
| 8,397,269 B2 | * | 3/2013 | Barrett | H04N 5/4401 725/120 |
| 8,458,318 B2 | * | 6/2013 | Gulati | H04L 49/90 709/223 |
| 8,630,179 B1 | * | 1/2014 | Cotter | H04L 1/205 370/235 |
| 8,656,224 B2 | | 2/2014 | Duchenay et al. | |
| 8,656,225 B2 | | 2/2014 | Duchenay et al. | |
| 8,787,163 B1 | * | 7/2014 | Nemavat | H04L 12/54 370/231 |

(Continued)

OTHER PUBLICATIONS

European Search Report—EP14159882.1—dated Aug. 4, 2014.

(Continued)

*Primary Examiner* — Edan Orgad
*Assistant Examiner* — Emmanuel K Maglo
(74) *Attorney, Agent, or Firm* — Banner & Witcoff, Ltd.

(57) ABSTRACT

A method and system may allow for adjusting network latency experienced by a user. A first computing device may send a request to adjust the latency experienced by a terminal associated with a user. The request may be received at a second computing device which may identify a buffer size for to the terminal associated with the user. A new buffer size may be determined and adjusted for the identified buffer based on the received request.

60 Claims, 7 Drawing Sheets

(56) References Cited

U.S. PATENT DOCUMENTS

| | | | |
|---|---|---|---|
| 8,797,877 B1 | 8/2014 | Perla et al. | |
| 8,849,955 B2* | 9/2014 | Prahlad | G06Q 50/188 |
| | | | 709/219 |
| 8,875,208 B1* | 10/2014 | Abkairov | H04L 65/60 |
| | | | 725/115 |
| 9,565,139 B2* | 2/2017 | Veiga | H04L 49/9005 |
| 9,917,779 B2* | 3/2018 | Pullen | H04L 12/2801 |
| 10,043,137 B1* | 8/2018 | Jorgensen | G06N 20/00 |
| 2002/0009051 A1 | 1/2002 | Cloonan | |
| 2002/0036981 A1* | 3/2002 | Park | H04L 41/32 |
| | | | 370/230 |
| 2002/0126699 A1 | 9/2002 | Cloonan et al. | |
| 2004/0034863 A1* | 2/2004 | Barrett | H04L 47/72 |
| | | | 725/38 |
| 2004/0034864 A1* | 2/2004 | Barrett | H04N 21/8453 |
| | | | 725/38 |
| 2004/0163127 A1* | 8/2004 | Karaoguz | H04L 65/4076 |
| | | | 725/120 |
| 2005/0021716 A1 | 1/2005 | Adamczyk et al. | |
| 2005/0180323 A1* | 8/2005 | Beightol | H04L 29/06027 |
| | | | 370/230 |
| 2006/0045138 A1 | 3/2006 | Black et al. | |
| 2006/0075420 A1 | 4/2006 | Ludvig et al. | |
| 2006/0174032 A1 | 8/2006 | Winchester et al. | |
| 2006/0187970 A1 | 8/2006 | Lee et al. | |
| 2007/0019618 A1* | 1/2007 | Shaffer | H04M 3/2236 |
| | | | 370/352 |
| 2007/0127466 A1* | 6/2007 | Seon | H04L 29/06027 |
| | | | 370/389 |
| 2009/0092055 A1* | 4/2009 | Balasubramanian | H04L 45/00 |
| | | | 370/252 |
| 2009/0119736 A1 | 5/2009 | Perlman et al. | |
| 2009/0125961 A1 | 5/2009 | Perlman et al. | |
| 2009/0158373 A1* | 6/2009 | Belz | H04N 21/4147 |
| | | | 725/114 |
| 2009/0285217 A1* | 11/2009 | Frink | H04N 21/4385 |
| | | | 370/394 |
| 2010/0129050 A1* | 5/2010 | Alexander | H04N 21/25816 |
| | | | 386/343 |
| 2010/0271944 A1 | 10/2010 | Michaelis et al. | |
| 2010/0309783 A1* | 12/2010 | Howe | H04L 43/0852 |
| | | | 370/230 |
| 2010/0329355 A1* | 12/2010 | Pandey | H04N 21/4383 |
| | | | 375/240.25 |
| 2011/0093628 A1* | 4/2011 | Bulgin | G06F 5/14 |
| | | | 710/56 |
| 2011/0105080 A1* | 5/2011 | Haughn | H04L 63/18 |
| | | | 455/411 |
| 2011/0255535 A1* | 10/2011 | Tinsman | H04L 65/605 |
| | | | 370/390 |
| 2012/0002109 A1* | 1/2012 | Kennedy | H04N 21/242 |
| | | | 348/462 |
| 2012/0042060 A1* | 2/2012 | Jackowski | H04L 47/2475 |
| | | | 709/224 |
| 2012/0066558 A1 | 3/2012 | Duchenay et al. | |
| 2012/0167140 A1* | 6/2012 | Park, II | H04N 21/2353 |
| | | | 725/39 |
| 2012/0213295 A1* | 8/2012 | Quere | H04N 21/6377 |
| | | | 375/240.25 |
| 2012/0216082 A1 | 8/2012 | Duchenay et al. | |
| 2012/0297081 A1* | 11/2012 | Karlsson | H04L 65/60 |
| | | | 709/231 |
| 2013/0051225 A1* | 2/2013 | Pullen | H04L 47/12 |
| | | | 370/230 |
| 2013/0077486 A1* | 3/2013 | Keith | H04L 47/22 |
| | | | 370/230.1 |
| 2013/0223538 A1* | 8/2013 | Wang | H04N 21/43637 |
| | | | 375/240.25 |
| 2014/0032781 A1* | 1/2014 | Casey | H04L 29/06027 |
| | | | 709/233 |
| 2014/0149575 A1 | 5/2014 | Blackwell et al. | |
| 2015/0334153 A1* | 11/2015 | Koster | H04L 65/4069 |
| | | | 709/219 |

OTHER PUBLICATIONS

European Office Action—EP Appl. 14159882.1—dated Jan. 7, 2016.

Apr. 8, 2020—Canadian Office Action—CA 2,845,989.

Feb. 2, 2021—Canadian Office Action—CA 2,845,989.

* cited by examiner

REMOTE LATENCY ADJUSTMENT

BACKGROUND

High latency has become a complex problem for modern day networks. Network users continue to demand high bandwidth access. However, as the bandwidth increases, buffer sizes also increase which has an unintended consequence of increasing latency due to delays in filling the much larger buffers. For example, a small buffer fills up quickly and hence packets are not stored as long. However, as the buffer fills, flow control limits the connection speed associated with the buffer. A large buffer takes much longer to fill and hence supports much higher connections. However, as the larger buffer fills up latency is increased substantially. As the latency increases to provide higher bandwidth, the latency can have detrimental effects on a number of software applications. For instance, applications that require faster real-time communication (e.g., real-time applications such as video gaming, video-conferencing, IP telephony, etc.) can be significantly impacted by a high latency connection. If the latency increases beyond a certain level, pauses, delays, and jitter may be encountered and in some cases a connection may be lost.

Further, even where the connection is maintained, often the quality will degrade as the codec switches to a much lower speed and/or lower resolution image/voice mode to attempt to correct for the latency issues. Hence quality suffers and the user's experience is impacted. While some systems attempted to address latency with quality of service (QoS) priority settings, these QoS priority settings are different on every network, difficult to manage on a global network, are not supported on a universal basis, and do not fully address the latency issues, e.g., associated with buffer size. Accordingly, there is a need to better manage networks, including needs to manage latency to lessen its negative effects on performance, to improve user experience and to implement a system that works universally and globally.

SUMMARY

The following summary is for illustrative purposes only, and is not intended to limit or constrain the detailed description.

In illustrative examples, a computing device such as termination system may assign each user and each application a uniform buffer size based on the bandwidth of the connection. This buffer size is optimized for the highest throughput, typically with a large buffer size. This buffer size may be conventionally not optimized for different user preferences and/or application requirements. In order to accommodate real-time applications, or other applications requiring quick communications, in accordance with the present examples, embodiments introduce the ability to manually or dynamically adjust the buffer size to an appropriate size optimized to the application. For example, where the application is a real-time computer game having a centralized server located at a certain geographic distance from the terminal desiring to use the server, the application, the data services provider/administrator, and/or the user may request an appropriate buffer size to optimize performance for that application and/or the particular geographic distance in conjunction with the desired application.

In one embodiment, a service provider may provide a user with an application that allows the user to manually control characteristics of his own network connection. For example, a user may be presented with mode change buttons allowing the user to select modes such as 1) Gaming mode (e.g., a low latency, low bandwidth mode), 2) VoIP mode (e.g., a low latency, low bandwidth mode), 3) video conference mode (e.g., a low latency, medium bandwidth mode), and/or 4) a data transfer mode (e.g., a high bandwidth, high latency mode). These and other modes may be accessed and selected via any interface such as a smartphone, computer display device, keyboard, remote control, gaming console, tablet interface, and/or other suitable device.

In some embodiments, a first computing device may send a request to adjust the latency experienced by a terminal/modem associated with a user. The request may include a requested latency mode for the terminal and identification information that uniquely identifies the terminal (e.g., a MAC address). The request may be received at a second computing device, such as a termination system (e.g., a cable modem termination system (CMTS), or an optical line terminal (OLT), etc.). The second computing device may identify an appropriate buffer size for the terminal associated with the user based on, for example, information provided by the terminal, application, and/or user, where the buffer stores data to be sent to the terminal or data sent from the terminal. A buffer size may be determined for the identified buffer based on the requested latency mode. A size for the identified buffer may be adjusted up or down based on the determined buffer size requested by the terminal, application, and/or user.

In some embodiments, the terminal may select a default and/or current latency mode from a plurality of latency modes. A request from the terminal may comprise a request to change the default and/or current latency mode. The plurality of latency modes may have predetermined buffer sizes. Alternatively, these buffer sizes may be varied and/or altered based on a feedback control loop established with the application, terminal, and/or user. For example, in a video conference call, one user may have a static video screen where the user is sitting still and not moving in the image or completely off camera. Another user may be walking down the street, riding a bike, driving a car/boat and require a much different connection. The buffer may be adjusted to provide the optimal performance of bandwidth and/or latency based on manual or automatic feedback, such as feedback from the application/terminal/codec, and/or a feedback from control loop and/or other intelligent agent in the local modem and/or terminal.

In some embodiments, latency management may be based on a particular device identifier, e.g., MAC address and/or on a particular channel or communication link identified as being associated with a particular MAC address. For example, in certain embodiments, the identification information may comprise MAC address information and/or MAC address information in conjunction with channel information that identifies one or more channels for the terminal associated with the user. In still further embodiments, certain channels may be reserved for certain types of applications. Thus, in these embodiments the termination system may be able to ascertain the types of communications and/or associated latency requirements from the channel utilized by the application. Thus, the buffer characteristics in the termination system may be further identified based on the associated channel used by the terminal, user, and/or application.

In some embodiments, a current latency mode for a terminal associated with a user may be determined and may be displayed to a user. For example, an application running on a terminal associated with a modem may be able to query the termination system (e.g., CMTS, OLT, etc.) about a current status of a latency mode associated with the user, MAC address, channel, and/or terminal. In certain embodiments, the termination system may maintain individual buffers for each user/MAC address, channel and/or terminal. In this event, a user, terminal, and/or application may be able to query the termination system as to the current latency state of the communication mode and then request a change in that mode. In this manner, the individual user, terminal, and/or application may impact the buffer size allocated by the termination system. This communication may be initiated through a standard application programming interface and/or built into a modem communication protocol in future versions, for example, into a DOCSIS protocol or any other data transmission. Thus, changes in latency mode may be standardized for all applications connected to the termination system and/or utilized through standard application programming interfaces and/or modem command interfaces. In one exemplary embodiment, a latency adjustment API may include as parameters certain identification information (e.g., a MAC address and/or channel), capability to request for current latency mode and/or request for a change in latency mode, request for an interactive feedback control system to determine an optimal latency mode for a particular application/device.

In some embodiments, a computing device may monitor or be monitored for an application that has a preferred latency mode, and the request for a predetermined latency mode and/or the display for a manual latency mode may be triggered by a detection of such an application. In alternate embodiments, the modem and/or termination system may perform a packet inspection and automatically reconfigure its latency mode for any particular MAC address and/or channel combination based on the type of traffic being sent at any particular instance in time. In these embodiments, the packet inspection may occur, for example, in the termination system and/or in a modem and/or home gateway.

Unlike QoS priority systems, a change in buffer size associated with an individual MAC address and/or channel has no impact on other users of the system and/or overall complexity of the system. The change of buffer size may be implemented on the termination system with no impact on other users and/or the overall termination system. Termination systems in accordance with embodiments include an interface that allows a user, modem, terminal, and/or application to request a change in buffer size. Thus, termination systems described herein dynamically set buffer size associated with, for example, a MAC address and/or channel, based upon requests and/or feedback from an customer premises device and/or analysis of traffic coming from a customer premises device.

In still further embodiments, the latency mode allows for additional revenue models associated with high bandwidth services. For example, certain users such as gamers may pay a premium to be able to have the highest scores in interactive on-line gaming. Gamers may pay, for example, a premium (e.g., $5/month) for the ability to have much less latency when playing their desired game. These users may be provided with a competitive advantage over other users, and such may distinguish one service provider from another.

In still further embodiments, the low latency mode may be replicated in other network equipment beyond the termination system such as throughout the internal and external routers between the customer premises equipment and/or the server. For example, the API request for a low latency mode (e.g., gaming mode) may be built into the routers operating system such as Junos, IOS and/or NX. In this manner, the request for a low latency connection may be forwarded and replicated across the entire network path between the customer premises equipment and the server (e.g., a gaming server).

In still further embodiments, the latency mode may be reset to a default mode automatically after a predetermined period of time. This default mode may be user defined and/or determined by the termination system, terminal, user, modem, and/or home gateway.

Embodiments of described herein may easily be added to any computing device, such as to every modem, termination system, gateway, router, user device such as a smartphone or gaming console, and/or other network and/or server device. By defining appropriate API's and requesting that vendors implement the APIs to implement latency modes in accordance with the embodiments herein, these features may become universally available across the entire network vastly improving the user experience.

In still further embodiments, latency across a network (e.g., a MPLS network) can vary with frame size. For example, where smaller frames are utilized such as an 86 byte frame, latency may be as small as 0.025 seconds. However, as frame and throughput increases, latency may also increase. For example, when using a frame size of 1518 bytes, latency may be 10 times as much such as 0.25 s.

In still further embodiments, interface/termination system may be configured to request a smaller packet size. For example, by using the Packet Too Big message in IPv6, the interface/termination system may cause the user device to output smaller packet sizes, thus resulting in lower overall latency across the entire packet network and/or Internet.

As noted above, this Summary is merely a summary of some of the features described herein. It is not exhaustive, and it is not to be a limitation on the claims. Further embodiments are described below.

BRIEF DESCRIPTION OF THE DRAWINGS

Aspects of the present disclosure are described by way of example with respect to the accompanying figures in which like numerals indicate similar elements.

DETAILED DESCRIPTION

In the following description, reference is made to the accompanying figures, in which are shown various illustrative embodiments. It is to be understood that other embodiments may be utilized and structural and functional modifications may be made, without departing from the scope of the present disclosure.

Figure 1:
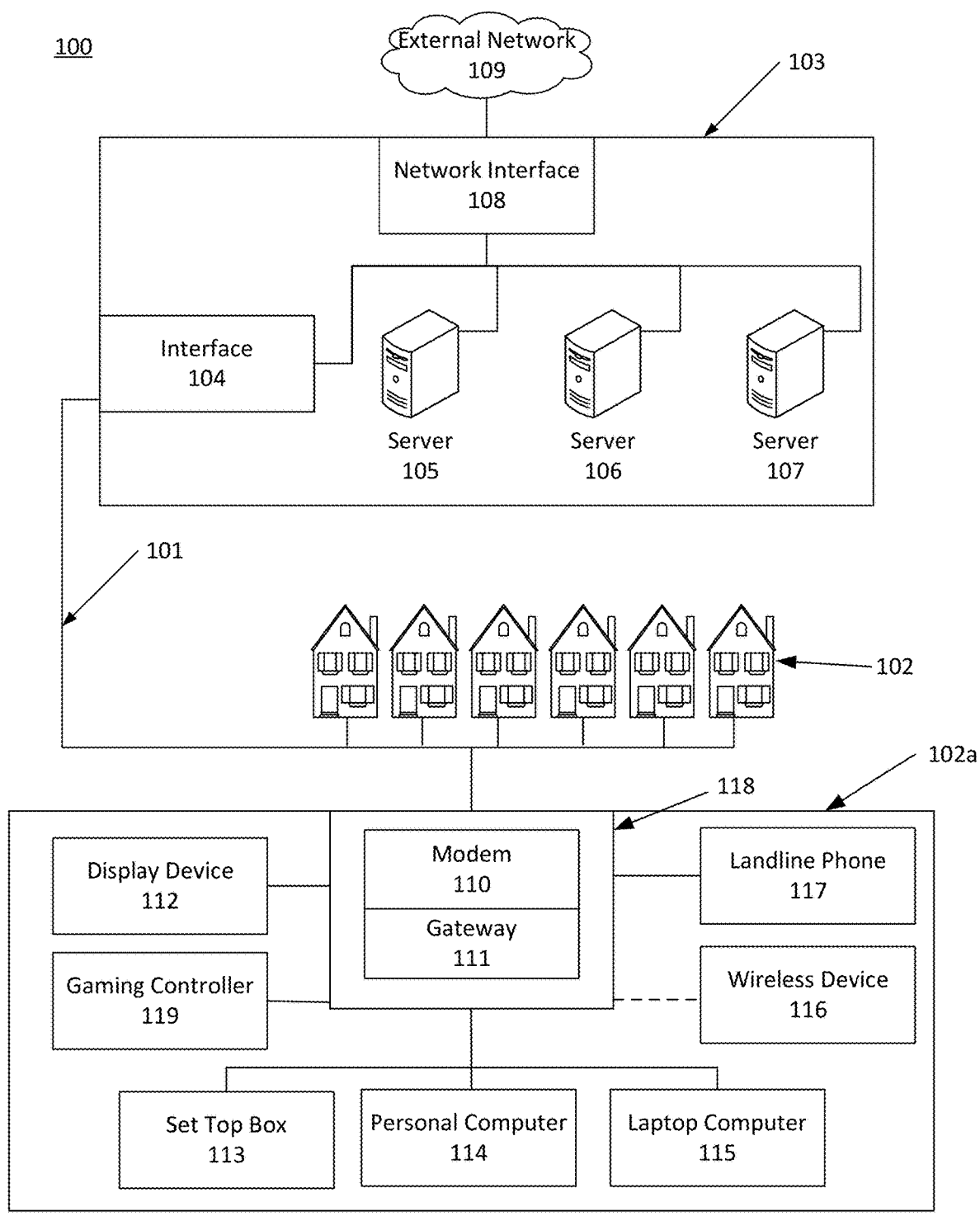
FIG. 1 illustrates an example network according to one or more embodiments.

FIG. 1 illustrates an example network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax, wired, and/or wireless distribution network. Communication network 100 may include interconnected communication links 101 (e.g., coaxial cables, optical fibers, wireless, etc.) to connect multiple premises 102 (e.g., businesses, homes, consumer dwellings, etc.) to a central communication system 103 (e.g., headend, central office, etc.). The central communication system 103 may transmit downstream information signals onto the links 101, and each premises 102 may have a receiver used to receive and process those signals.

There may be one link 101 originating from the central communication system 103, and it may be split a number of times to distribute the signal to various premises 102 in the vicinity (which may be many miles) of the central communication system 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The central communication system 103 may include an interface, such as interface 104 (e.g., a termination system such as a CMTS). In an example of a hybrid fiber and coaxial cable (HFC) system, the interface 104 may be a cable modem termination system (CMTS, or an OLT), which may be a computing device configured to manage communications between devices on the network of links 101 and backend devices such as servers 105-107 (to be discussed further below). For example, central communication system 103 may be a service provider that provides Internet service to premises 102. The interface 104 may be as specified in a standard, such as the Data Over Cable Service Interface Specification (DOCSIS) standard, published by Cable Television Laboratories, Inc. (a.k.a. Cable-Labs), or it may be a similar or modified device instead. The interface 104 may be configured to place data on one or more downstream frequencies to be received by modems at the various premises 102, and to receive upstream communications from those modems on one or more upstream frequencies.

The central communication system 103 may also include one or more network interfaces 108, which can permit the central communication system 103 to communicate with various other external networks 109. These networks 109 may include, for example, networks of internet and/or Internet devices, telephone networks, cellular telephone networks, fiber optic networks, local wireless networks (e.g., WiMAX), satellite networks, intranets, and/or any other desired networks, and the network interface 108 may include the corresponding circuitry needed to communicate on the external networks 109, and/or to other devices on these networks such as a cellular telephone network and its corresponding cell phones.

As noted above, the central communication system 103 may include a variety of servers 105-107 that may be configured to perform various functions. For example, the central communication system 103 may include a push notification server 105. The push notification server 105 may generate push notifications to deliver data and/or commands to the various premises 102 in the network (or more specifically, to the devices in the premises 102 that are configured to detect such notifications). The central communication system 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The central communication system 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102.

In some embodiments, an application server may comprise a video game server. For example, a computing device (e.g., video game console, laptop, desktop, tablet, etc.) may include a game application that may communicate with one or more video game servers over network link 101. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102(*a*), such as a home, may include an interface 118. The interface 118 can include any communication circuitry needed to allow a device to communicate on one or more links 101 with other devices in the network. For example, the interface 118 may include a modem 110, which may include transmitters and receivers used to communicate on the links 101 and with the central communication system 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 118. Further, the interface 118 may include a gateway interface device 111. The modem 110 may be connected to, or be a part of, the gateway interface device 111. The gateway interface device 111 may be a computing device that communicates with the modem(s) 110 to allow one or more other devices in the premises 102(*a*), to communicate with the central communication system 103 and other devices beyond the central communication system 103. The gateway 111 may be a set-top box (STB), digital video recorder (DVR), computer server, or any other desired computing device. The gateway 111 may also include (not shown) local network interfaces to provide communication signals to requesting entities/devices in the premises 102(*a*), such as display devices 112 (e.g., televisions), additional STBs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others. Any of interface 118, modem 110, gateway 111, display device 112, set top box 113, personal computer 114, laptop computer 115, wireless device 116, or landline 117 may comprise a terminal connected to network link 101. One or more computing devices at premises 102(a) may comprise a user to a service (e.g., Internet service) provided by a service provider (e.g., central communication system 103).

Figure 2:
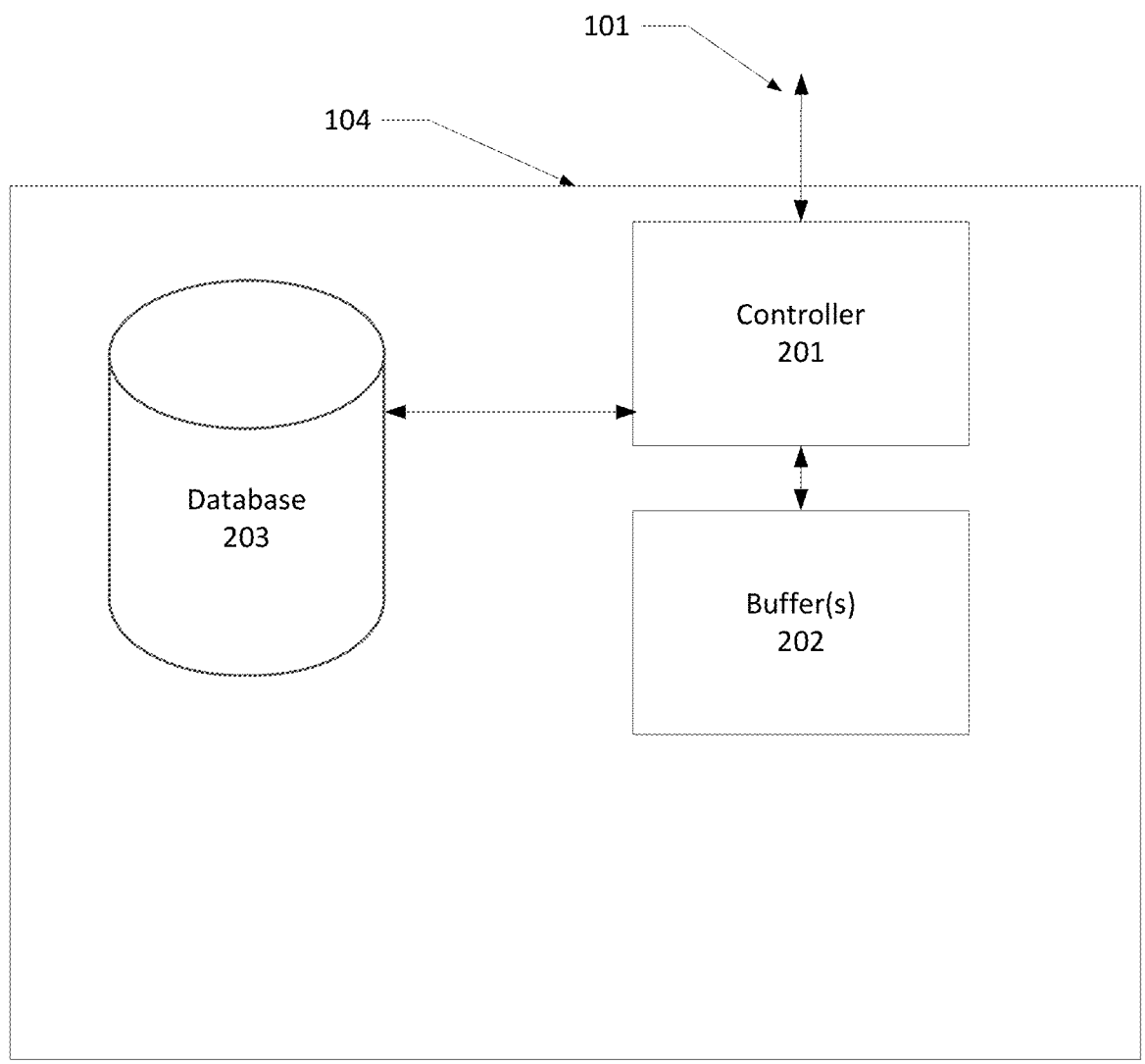
FIG. 2 illustrates an example block diagram according to one or more embodiments.

FIG. 2 illustrates an exemplary interface 104 (e.g., a termination system such as a CMTS) configured for adjusting latency according to some embodiments. In exemplary embodiments, interface 104 may be variously configured. In one embodiment, the interface 104 may include controller 201, buffer(s) 202 (e.g., associated with either individual user device(s) at premises 102, with individual modems 110, and with one or more MAC addresses and/or associated channels), and one or more database(s) 203 which may either be internal and/or external to the interface 104. In some embodiments, interface 104 may be configured to control the size of the buffer(s) 202 responsive to information stored in database 203, input and/or feedback from computing device 204 and/or its own analysis and/or packet inspection of traffic over the link(s) 101 associated with different user device(s) at premises 102 and/or one or more applications (e.g., applications running in set top box 113, personal computer 114 (e.g., skype), laptop computer 115, wireless device 116, landline phone 117 (e.g., IP phone), modems 110 and/or any associated channels).

In exemplary embodiments, a user device at premises 102 may adjust network latency by communicating with interface 104 such as with controller 201 and/or database 203 in order to modify buffer(s) 202. For example, buffer(s) 202 may comprise a plurality of adjustable buffer sizes and controller 201 may adjust the size of buffer(s) 202 based on a received request, MAC addresses and/or associated channels, feedback input, and/or its own packet inspection. One or more of Buffer(s) 202 may be associated with one or more terminals/MAC address/channels and may store network data received from the terminals and/or may store network data to be sent to the terminals. Database 203 may store information, for example, subscription information, about users, MAC addresses, default parameters associated with latency, channels, applications, and/or other information helpful in making decisions about latency. Controller 201 may access database 203 in order to, for example, determine a buffer size for a terminal that is associated with a user and/or perform a packet inspection (e.g., packet type inspection, packet payload inspection, etc.) in order to optimize buffer size. In some embodiments, computing device 201 and database 203 may be implemented by and/or or communicatively coupled to interface 104.

Example processes of adjusting latency are described further below in FIGS. 3 and 4 with reference to FIGS. 1 and 2. In some embodiments, a user (e.g., a user device at premises 102(a)) may subscribe to a service from a service provider (e.g., central communication system 103) where the service provider may provide cable, Internet, phone, a combination of these services, or any other suitable service to the user. In an example, interface 104, located at a central communication system 103 may communicate with a user device at premises 102 (e.g., modem 110, gateway 111, and any of the associated devices 112, 113, 114, 115, 117, and/or 116) to adjust the network latency experienced by the user.

In some embodiments, the service provider may provide Internet service to a user. For example, a package may indicate that the user is to receive a predetermined network bandwidth (e.g., a 100 Mbps (Megabits per second) download bandwidth and a 20 Mbps upload bandwidth) or a dynamic bandwidth that changes based on conditions (e.g., network congestion, etc.). The subscription package information may also include additional information about the user and the Internet service for the user (e.g., physical location, MAC address for terminals, etc.) Subscription package information may be stored in database 203. Further, database 203 may include information about user device(s) at premises 102 such as application(s), devices (e.g., gaming controllers, cellular phones), channels, modems, gateways, etc. This information may be useful in determining optimal latency parameters to be associated with different devices.

In some embodiments, data to be sent to a terminal (e.g., modem 110) or sent from the terminal may be buffered at buffer(s) 202. For example, one of buffer(s) 202 may be designated for modem 110 for example, by virtue of one or more MAC addresses and/or an associated channel. Buffers are commonly utilized in termination systems to prevent packet loss while waiting for bandwidth to become available on an upstream and/or downstream time division multiplexed and/or packet based communication path. A size for the designated buffer may affect the network latency experienced by a user associated with modem 110. In illustrative examples, a modem termination system (e.g., a CMTS) typically assigns each user and each application a uniform buffer size based on the bandwidth of the connection. This buffer size may be optimized for the highest throughput, typically with a large buffer size. This buffer size is conventionally not optimized for different user preferences and/or application requirements. In order to accommodate real-time applications in accordance with the present embodiments, the interface 104 includes an ability to dynamically adjust the buffer size to an appropriate size optimized to the application desiring to send and receive data. For example, where the application on, for example, a user device at premises 102(a), is a real-time computer game having a centralized server located at a certain geographic distance from the terminal desiring to use the server, the application and/or user may request an appropriate buffer size to optimize performance for that application and/or the particular geographic distance in conjunction with the desired application.

In one embodiment, a service provider may provide a user with an application that allows the user to manually control characteristics of his own network connection. This application may, for example, be installed on modem 110, gateway 111, and/or any of the user devices such as personal computer 114 and/or a gaming controller 119. For example, a user may be presented with mode change buttons on display device 112 allowing the user to select modes available from controller 201 such as 1) Gaming mode (e.g., a low latency, low bandwidth mode), 2) VoIP mode (e.g., a low latency, low bandwidth mode such as Google Voice), 3) video conference/Skype mode (e.g., a low latency, medium bandwidth mode), and/or 4) a data transfer mode (e.g., a high bandwidth, high latency mode). These modes may be selected via a computer interface such as a keyboard, remote control, gaming counsel, tablet interface, and/or other suitable device. Alternatively, controller may dynamically select these modes using a feedback mechanism and/or its own packet inspection (e.g., packet type inspection, packet payload inspection, etc.).

Figure 3:
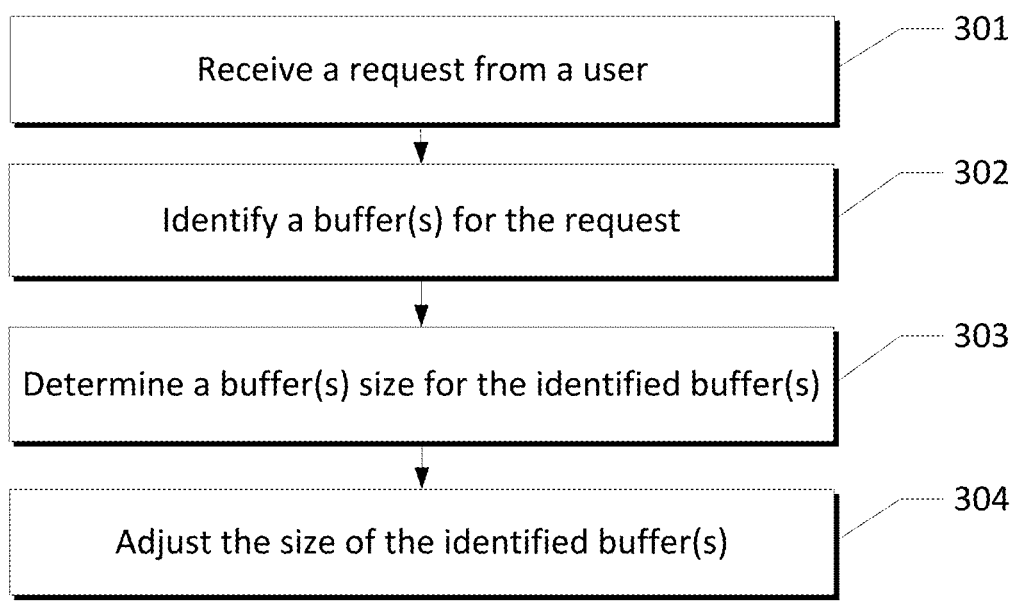
FIG. 3 illustrates an example process for adjusting latency according to one or more embodiments.

FIG. 3 illustrates exemplary steps that may be performed to adjust network latency in some embodiments. For example, interface 104 may perform some or all of the steps of FIG. 3. The process may begin at step 301 where a communication is received from a user or associated user device. For example, a user device at premises 102(a) and may send a request to controller 201.

In some embodiments, the communication may comprise a request to adjust the network latency experienced by the user. For example, the request may be a request to switch from a current mode to one of a high, average, or low latency mode. In another example, the request may be request to switch from a current mode indicated by a value along a latency range, where the range extends from high latency to low latency, to a new mode indicated by a new value along the latency range. In some embodiments, the request to adjust network latency experienced by a user may comprise connection preference information.

In some embodiments, the request may also include identification information for a user or a terminal associated with the user. For example, the identification information may be a MAC address for a user device on premises 102(a) (e.g., a MAC address and/or associated channel for modem 110, gateway 111, interface 118, set top box 113, etc.). In another example, the identification information may comprise any suitable information to identify a terminal for a user (e.g., a user device at premises 102(a)).

In some embodiments, the identification information may further identify one or more channels for a terminal associated with a user. For example, a terminal associated with a user may comprise modem 110. Modem 110 may communicate with an interface 104 based on modulated signals (e.g., radio frequency (RF) signals, optical signals, etc.) sent over a network (e.g., network link 101). Modem 110 may have designated frequencies over which modulated signals may be sent. For example, modem 110 may have one or more designated 6 Mhz channels over which modulated signals may be sent to communicate with interface 104. In some embodiments, the identification information may include a MAC address for modem 110 and further include channel information that identifies one or more channels designated to modem 110.

In some embodiments, the identification information may comprise subscription information that uniquely identifies a user (e.g., a user associated with a user device at premises 102(a)). For example, the subscription information may comprise an account number for the user and/or an associate MAC address. One or more terminals may be associated with the subscription information and/or MAC address. For example, database 203 may store an association between the subscription information for a user and one or more user device(s) at premises 102(a).

In some embodiments, the identification information may comprise subscription information and may further identify one of a plurality of terminals associated with the subscription information or one or more channels for a terminal associated with the subscription information. For example, where a plurality of terminals are associated with subscription information for a user, the request may include identification information that uniquely identifies one of the terminals (e.g., a MAC address) and/or the capabilities of the terminal (e.g., gaming controller 119). In another example, where the received request comprises a request to adjust latency experienced on one or more channels of a terminal (e.g., one or more channels for cable modem 110) the identification information may include channel information that uniquely identifies the one or more channels.

The process may progress from step 301 to step 302, where a buffer is identified for the request. For example, buffer(s) 202 at computing device 200 may store network traffic to and from one or more terminals (e.g., modem 110, user devices 112-119, etc.) associated with one or more users. The received request may include identification information for a terminal associated with the user that may be used to identify a buffer associated with the terminal from buffer(s) 202. In some embodiments, database 203 may store an association between identification information for a terminal and a buffer associated with the terminal. For example, the identification information may comprise a MAC address for a terminal associated with a user and the MAC address may be used to identify the buffer. In another example, the identification information may be any suitable information that may be used to identify a buffer associated with a terminal.

In some embodiments, database 203 may store an association between identification information for one or more channels for a terminal and a buffer associated with the one or more channels. For example, the identification information may comprise a MAC address that identifies a terminal associated with a user and may further comprise channel information that identifies one or more channels of the terminal, where the identification information may be used to identify the buffer associated with the one or more channels of the terminal.

Again referring to FIG. 3, the process may progress from step 302 to step 303, where a buffer size is determined for the identified buffer. In some embodiments, a buffer size may be based on subscription package information for the user. The subscription package may indicate a default buffer size. For example, a subscription package with a 30 Mbps download bandwidth may indicate a first default buffer size and a subscription package with a 50 Mbps download bandwidth may indicate a second default buffer size. In some embodiments, the first default buffer size may be smaller than the second default buffer size.

In some embodiments, a default buffer size for one or more channels of a terminal may be based on a service designated to the one or more channels. For example, a service (e.g., streaming media, online video gaming, etc.) may be designated to one or more channels associated with the modem 110. In exemplary embodiments, a default buffer size for the one or more channels may be based on the service (e.g., streaming media, online video gaming, etc.)

In some embodiments, a terminal associated with the user may have a current mode of a plurality of modes. The modes may be one of high, average, or low latency. The determined buffer size for one of average mode or high mode may be the default buffer size. The received request may comprise a request to adjust the mode from the current mode (e.g., high, average, or low) to one of the other modes.

In another example, the mode may be based on a value along a latency range that extends from low latency to high latency. For instance, low latency may be defined as a first predetermined latency threshold at one end of the range and a high latency may be defined as a second predetermined latency threshold at the other end of the range. A mode may be represented by some value between these thresholds. The determined buffer size for the average value between the two thresholds may be the default buffer size. While the range is described as a latency range, one or more other metrics may be used to define the range. For example, the latency range may correspond to a bandwidth range and the predetermined upper and lower thresholds for the range for the latency for any given bandwidth. Additionally, the latency may be adjusted based on dynamic feedback from an application. In these examples, where jitter or other undesirable impact is being experienced by the application, it may dynamically communicate with interface 104 to decrease its latency. In another example, the latency range may correspond to a range in buffer size and the predetermined upper and lower thresholds for the range may be buffer size thresholds.

For a request to decrease the latency experienced by a user (e.g., an adjustment from high mode to average or low mode, an adjustment from average mode to low mode, an adjustment decreasing the value of along the latency range, etc.) the buffer size associated with the user, or terminal, may be decreased. For a request to increase the latency experienced by a user (e.g., an adjustment from low mode to average or high mode, an adjustment form low mode to average mode, an adjustment increasing the value of along the latency range) the buffer size associated with the user, or terminal, may be increased.

In some embodiments, a predetermined change in buffer size (e.g., increase or decrease) may be associated with a one-step change in mode. For example, a change from average mode to low mode (e.g. one step) may indicate a predetermined reduction in buffer size. A two-step change (e.g., high mode to low mode) may be associated with a second predetermined reduction in buffer size. In some embodiments, a change in buffer size may be based on a delta between the current value and a requested value (e.g., from the received request) along a latency range. For example, a value along a latency range may be the current mode and a requested value along the latency range may be the requested mode. A change in buffer size may be based on the delta between the current value and the requested value.

In some embodiments, a predetermined buffer size may correspond to a received latency mode. For example, each of latency modes low, average, and high may have a predetermined buffer size. In another example, each value along a latency range may have a predetermined buffer size. The predetermined buffer size may further be based on subscription information for a user.

Again referring to FIG. 3, the process may progress from step 303 to step 304, where a size for the identified buffer is adjusted based on the determined buffer size. For example, a buffer size may be determined for an identified buffer based on a requested latency mode, and the current buffer size for the identified buffer may be adjusted to the determined buffer size for the identified buffer. The process of FIG. 3 may be applicable to more than one buffer associated with a particular communication path.

Figure 4:
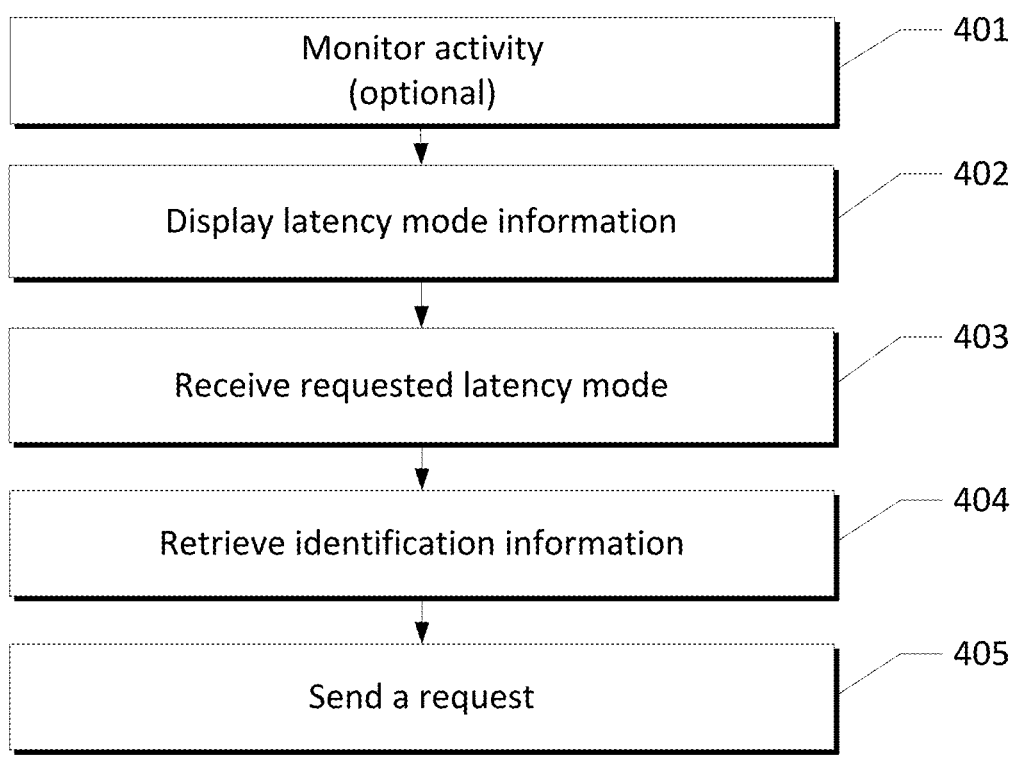
FIG. 4 illustrates an example process according to one or more embodiments.

FIG. 4 illustrates the steps performed to request an adjustment in network latency in some embodiments. For example, a user or associated user device at premises 102(a) and/or interface 104 may perform the steps of FIG. 4. In the flow associated with FIG. 4, the process may begin at step 401 where activity is monitored (e.g., by a user device at premises 102(a) such as modem 110 and/or by controller 201 via packet inspection).

For example, a user device a premises 102(a) may monitor launched and/or active applications having one or more preferred latency modes. A launched or running application may be identified as an application with a preferred latency mode. For example, a launched application may be an online video game (e.g. massively multiplayer video game) or a real-time communication application where the preferred latency mode for the application is low latency mode. In another example, the launched or running application may be an application that leverages high bandwidth and the preferred latency mode for the application may be high latency mode.

When an application with a preferred latency mode is detected based on the monitoring, a user of computing device 204 may be notified and/or controller 201 may adjust a latency mode for the user. For example, when an online video game is launched, the user may be notified that the launched application has a preferred latency mode of low. In some embodiments, a display, as described at step 402, may be launched that displays latency mode information for the user. In some embodiments, the user is notified if the preferred latency mode for the application is different from the current latency mode for the user.

Again referring to FIG. 4, at step 402, latency mode information for a user may be determined and displayed or otherwise presented to a user or associated user device. In some embodiments, step 402 is performed after step 401. In other embodiments, step 401 need not be performed. The latency mode information may be displayed, for example, as a webpage in a web browser, by a mobile application on a mobile computing device (e.g., wireless device 116), by an application on a computing device (e.g., terminal interface 205 on computing device 204), or in any other suitable manner. The latency mode may be for a terminal associated with a user (e.g., modem 110 associated with user) and/or may be for one or more channels of the terminal (e.g., one or more channels of modem 110). In some embodiments, the latency mode information comprises connection preference information.

Figure 5:
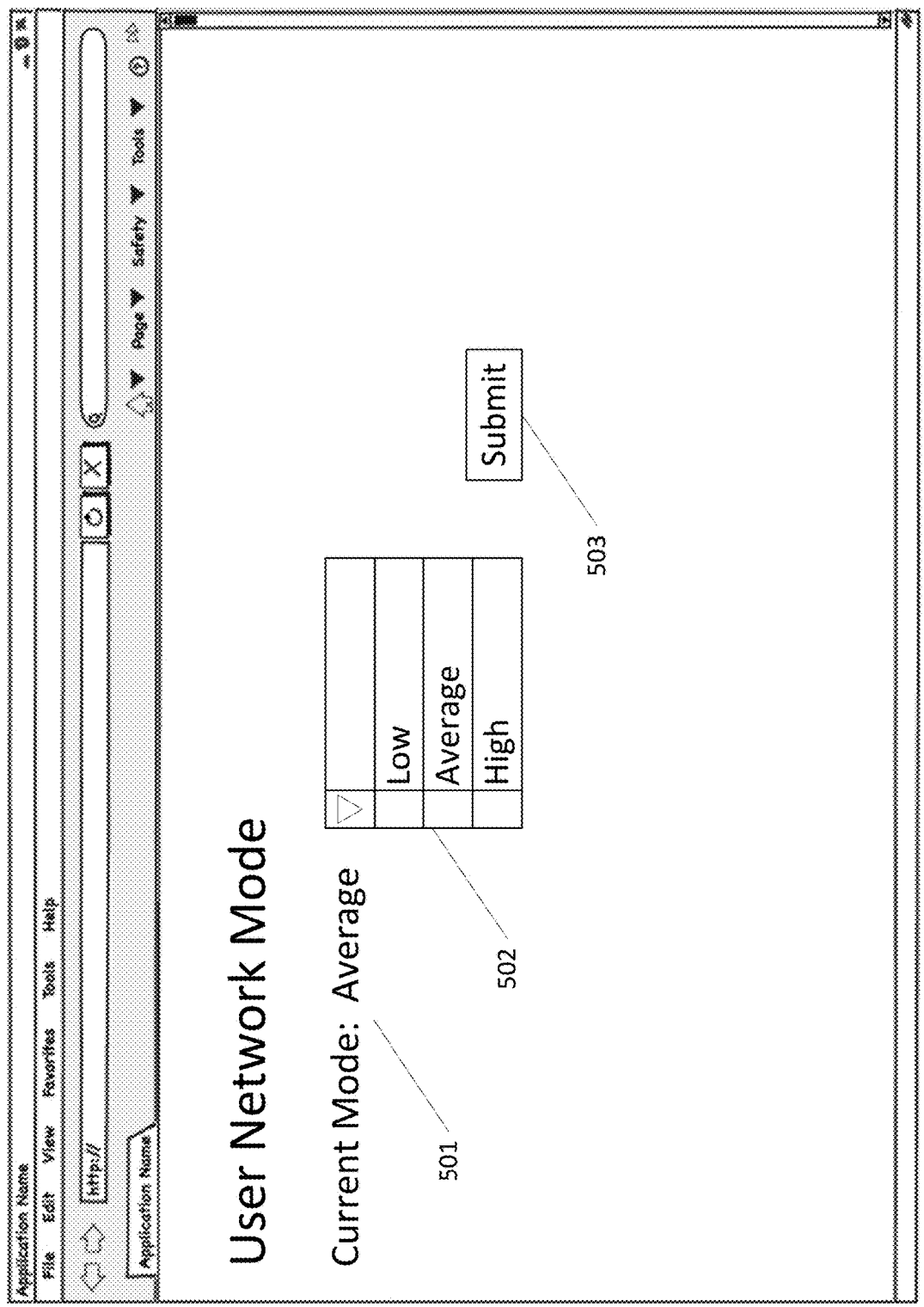
FIGS. 5 and 6 illustrate example interfaces according to one or more embodiments.
Figure 6:
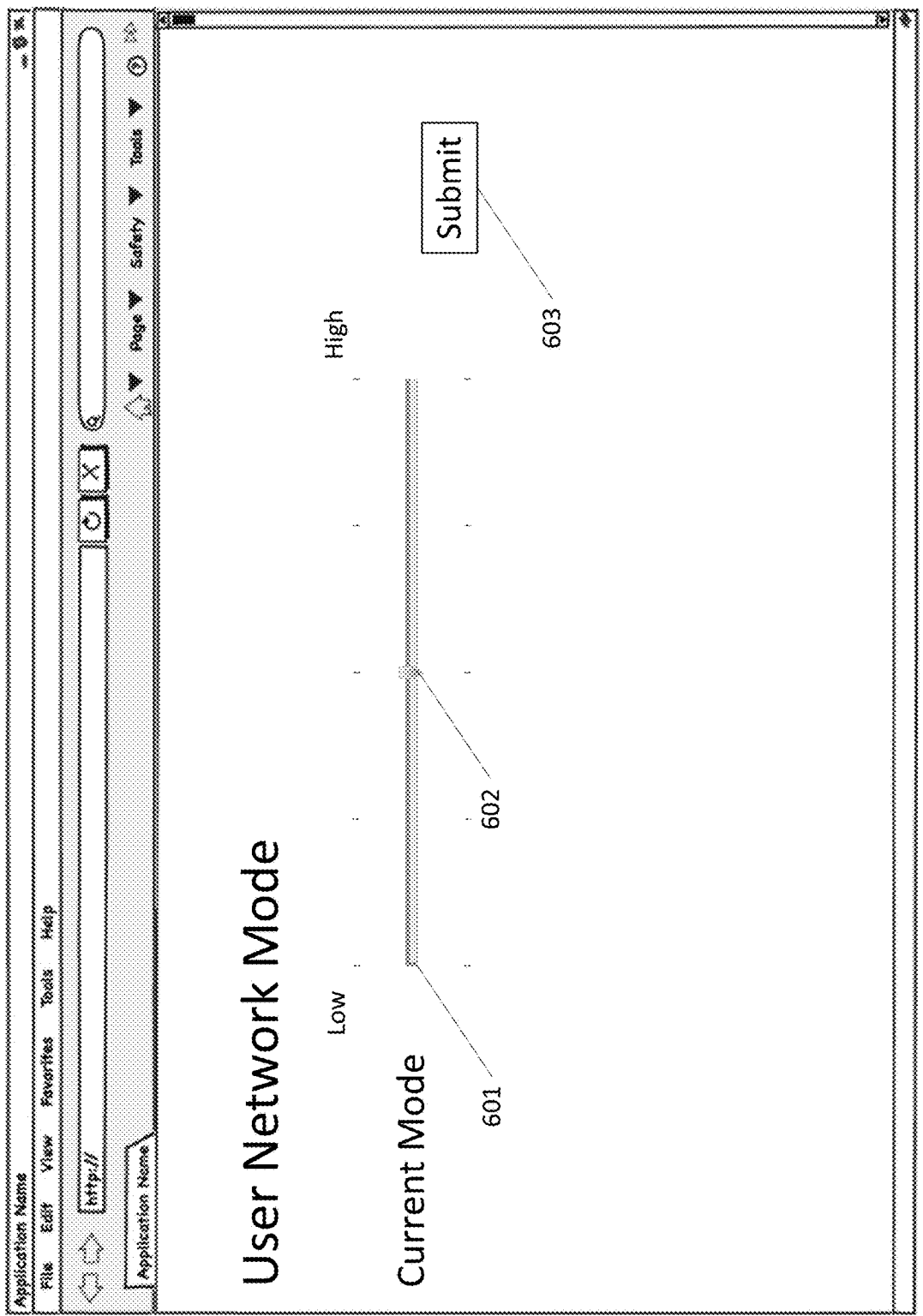

For instance, FIGS. 5 and 6 illustrate sample interfaces (e.g., webpages) that display latency mode information for a user. The webpages may be hosted by one or more server (e.g., servers 105-107) and the servers may communicate with interface 104 in order to submit requests to adjust a latency mode. The webpages may leverage a number of web technologies (e.g., HTML, CSS, Java-script, AJAX, J2EE, .NET, etc.) in order to implement an embodiment.

FIG. 5 illustrates a sample webpage that display latency mode information for a user where the latency mode may comprise one of low, average, or high. For example, current mode 501 may be displayed to a user and a request to change the current mode to one of low, average, or high latency mode may be entered using drop down menu 502. Once the requested mode is entered (e.g., using drop down menu 502), the user may submit the request using submit button 503.

FIG. 6 illustrates a sample webpage that display latency mode information for a user where the latency mode may comprise a value along a latency mode range. For example, a current mode may be displayed by slider bar 601 and slider 602, where slider bar 601 displays a latency range that extends from low to high and slider 602 displays the current mode along that latency range. The user may adjust a latency mode by moving slider 602 to a new position along slider bar 601 and submitting the request using submit button 603. FIGS. 5 and 6 are examples of displaying latency mode information to a user and the latency mode information may be displayed to a user in any other suitable manner.

The process of FIG. 4 may proceed from step 402 to step 403 where a requested latency mode is received from a user or provided by the user. For example, a requested latency mode may be received from drop down menu 502 after a user submits the request using submit button 503. In another example, a requested latency mode may be received from slider bar 601 and slider 602 after a user submits the request using submit button 603. These are mere examples and a requested latency may be received from a user in any other suitable manner.

The process of FIG. 4 may proceed from step 403 to step 404 where identification information may be retrieved. For example, the identification information may comprise a MAC address for a terminal (e.g., modem 110) associated with a user. In some embodiments, the identification information may comprise subscription information that uniquely identifies a user (e.g., account information). Identification information may further uniquely identify one out of a plurality of terminals associated with subscription information for a user. In some embodiments, the identification information may include channel information that uniquely identifies one or more channels of a terminal associated with a user. The identification information may further include application information that uniquely identifies one or more applications running on a user device.

In some embodiments, the interfaces (e.g., webpages) illustrated in FIGS. 5 and 6 may be a portion of a web portal, where the web portal may store one or more examples of the identification information described above. For example, the web portal may store one or more of subscription information for a user and one of the webpages illustrated in FIGS. 5 and 6 may be designated as a webpage where a user requests latency adjustments for the user. A request submitted from the designated webpage may accordingly include the subscription information. In some embodiments, the web portal may store identification information that uniquely identifies a terminal associated with a user (e.g., MAC address) and a request submitted from a designated webpage may accordingly include the identification information.

In some embodiments, the webpages illustrated in FIGS. 5 and 6 may be designated for a particular user, and the webpages may include additional web forms (e.g., drop down menus, sliders, text fields, etc.) used to identify one of a plurality of terminals associated with the user or one of a plurality of channels of a terminal associated with the user. For example, a drop down menu (not depicted) may be prepopulated with a plurality of terminals associated with the user, and the drop down menu used to identify one of the terminals for which a user is requesting a change in latency mode. In another example, a drop down menu (not depicted) may be prepopulated with a plurality of channels for a terminal associated with the user, and the drop down menu used to identify one or more of the plurality of channels for which a user is requesting a change in latency mode.

In some embodiments, latency mode information may be displayed to a user by a local application (e.g., mobile application, etc.). The local application may store one or more examples of the identification information described above and a request submitted from the location application may accordingly include the identification information.

The process of FIG. 4 may proceed from step 404 to step 405 where a request may be sent. For example, terminal interface 205 may send the request to interface 104 (e.g., at central communication system 103). The request may include a requested latency mode (e.g., low, average, high, a value along a latency range, etc.), identification information (e.g., a MAC address, one or more channels, subscription information, etc.), and any other suitable information. Based on the request, controller 201 may adjust the latency experienced by a user device(s)/user (e.g., via the identification information) in the request, as further detailed above.

Figure 7:
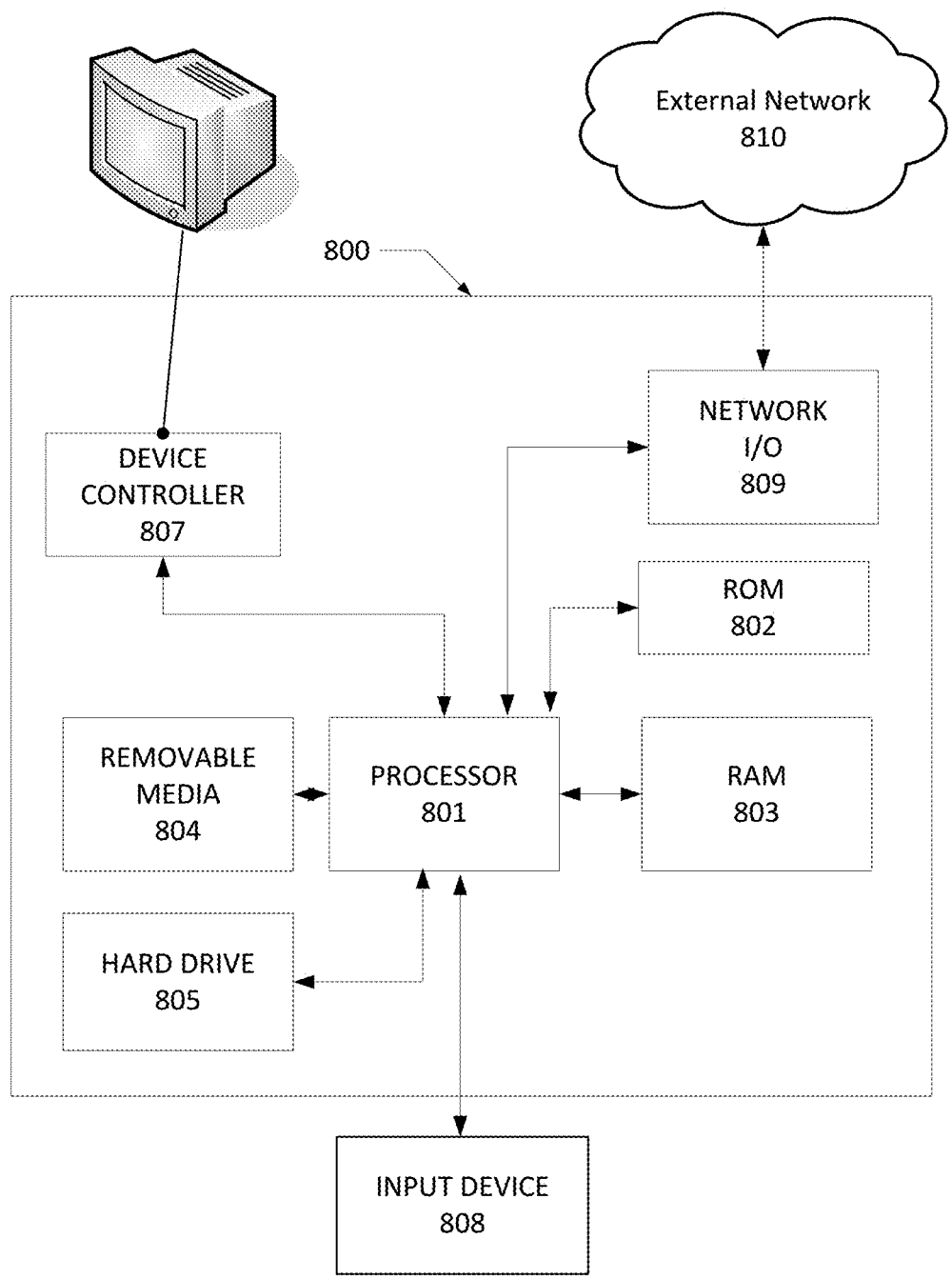
FIG. 7 illustrates an example computing device according to one or more embodiments

FIG. 7 illustrates hardware elements that can be used to implement any of the various computing devices discussed herein. For example, a device such as computing device 700 may be used to implement server 105, server 106, server 107, terminal system 104, network interface 118, gateway 111, set top box 113, personal computer 114, laptop computer 115 or wireless device 126. The computing device 700 may include one or more processors 701, which may execute instructions of a computer program to perform any of the features described herein. The instructions may be stored in a computer-readable medium or memory, to configure the operation of the processor(s) 701. For example, instructions may be stored in a read-only memory (ROM) 702, random access memory (RAM) 703, removable media 704, such as a Universal Serial Bus (USB) drive, compact disk (CD) or digital versatile disk (DVD), floppy disk drive, or other removable storage medium. Instructions may also be stored in an attached (or internal) hard drive 705. The computing device 700 may include one or more output devices, such as a display 706 (e.g., an external television), and may include one or more output device controllers 707, such as a video processor. There may also be one or more user input devices 708, such as a remote control, keyboard, mouse, touch screen, microphone, etc. The computing device 700 may also include one or more network interfaces, such as a network input/output (I/O) circuit 709 (e.g., a network card, wireless transceiver, etc.) to communicate with an external network 710. The network input/output circuit 709 may be a wired interface, wireless interface, or a combination of the two. In some embodiments, the network input/output circuit 709 may include a modem (e.g., a cable modem), and the external network 710 may include the communication link 101, the external network 109, an in-home network, a wireless, coaxial, fiber, or hybrid fiber/coaxial distribution system (e.g., a DOCSIS network), or other network.

The FIG. 7 hardware configuration is one example. Modifications may be made to add, remove, combine, divide, etc. components of the computing device 700 into different arrangements. Additionally, the same components (e.g., processor 701, ROM storage 702, display 706, etc.) may be used to implement any of the other computing devices and components described herein. For example, the various components herein may be implemented using computing devices having components such as a processor executing computer-executable instructions stored on a computer-readable medium, as illustrated in FIG. 7. Some or all of the components described herein may be a combination of hardware and software, and may co-exist in a common physical platform (e.g., a requesting entity can be a separate software process and program from the requesting entity, both of which may be executed as software on a common computing device).

One or more aspects of the disclosure may be embodied in computer-usable data and/or computer-executable instructions, such as in one or more program modules, executed by one or more computers or other devices. Program modules may include routines, programs, objects, components, data structures, etc. that perform particular tasks or implement particular data types when executed by a processor in a computer or other data processing device. The computer executable instructions may be stored on one or more computer readable media such as a hard disk, optical disk, removable storage media, solid state memory, RAM, etc. In various embodiments, the functionality of the program modules may be combined or distributed across multiple computing devices. In addition, the functionality over the various embodiments described herein may be embodied in whole or in part in firmware or hardware equivalents such as integrated circuits, field programmable gate arrays (FPGA), and the like. In some embodiments, a first computing device (e.g., a user device at premises 102(a)) may send a request to adjust the latency experienced by a terminal/modem associated with a user to, for example, interface 104. The request may include a requested latency mode for a user device at premises 102(a) and identification information that uniquely identifies the terminal (e.g., a MAC address of modem 110 and/or associated channel information). The request may be received at a second computing device, such as the interface 104 (e.g., a termination system such as a cable modem termination system (CMTS)). The second computing device (e.g., controller 201) may identify an appropriate buffer size for to the terminal associated with the user based on information provided by the terminal, application, and/or user, where the buffer stores data to be sent to the terminal or data sent from the terminal. A buffer size may be determined for the identified buffer 202 based on the requested latency mode. A size for the identified buffer may be adjusted up or down based on the determined buffer size requested by the terminal, application, and/or user.

In some embodiments, controller 201 may select a default and/or current latency mode from a plurality of latency modes and the request may comprise a request to change the default and/or current latency mode. The plurality of latency modes may have predetermined buffer sizes. Alternatively, these buffer sizes may be varied and/or altered based on a feedback control loop established with the application, terminal, and/or user in coordination with controller 201.

For example, in a video conference call, one user may have a static video screen where the user is sitting still and not moving in the image or completely off camera. Another user may be walking down the street, riding a bike, driving a car/boat and require a much higher connection speed. The buffer may be adjusted to provide the optimal performance of bandwidth and/or latency based on manual feedback, feedback from the application/terminal/codec, and/or a feedback from control loop and/or other intelligent agent in the local modem 110, a user device at premises 102(a), and/or controller 201 acting alone and/or in any combination.

In some embodiments, latency management may be based on a particular MAC address and/or on a particular channel identified as being associated with a particular MAC address. For example, in certain embodiments, the identification information may comprise MAC address information and/or MAC address information in conjunction with channel information that identifies one or more channels for modem 110 associated with a user. This information may optionally be stored in database 203. In still further embodiments, certain channels may be reserved for certain types of applications. Thus, in these embodiments the interface 104 may be able to ascertain the types of communications and/or associated latency requirements from the channel utilized by the application. Thus, the buffer characteristics in the interface 104 may be further identified based on the associated channel used by a user device at premises 102(a), the user, and/or an application associated with a user device at premises 102(a).

In some embodiments, a current latency mode for a user device at premises 102(a) associated with a user may be displayed. For example, an application running on a user device at premises 102(a) associated with a modem may be able to query interface 104 (e.g., CMTS) about a current status of a latency mode associated with the user, MAC address, channel, and/or user device at premises 102(a). In certain embodiments, the interface 104 may maintain individual buffers for each user/MAC address, channel and/or user device at premises 102(a). In this event, a user, user device at premises 102(a), and/or application may be able to query the interface 104 about the current latency state of the communication mode and then request a change in that mode. In this manner, the individual user, a user device at premises 102(a), and/or application may impact the buffer size allocated by the interface 104. This communication may be initiated through a standard application programming interface and/or built into a modem communication protocol in future versions such as, for example, into DOCSIS. Thus, changes in latency mode may be standardized for all applications connected to the interface 104 and/or utilized through standard application programming interfaces and/or modem command interfaces. In one exemplary embodiment, a latency adjustment API may include as parameters certain identification information (e.g., a MAC address and/or channel), a request for current latency mode and/or a request for a change in latency mode, a request for an interactive feedback control system to determine an optimal latency mode for a particular application/device.

In some embodiments, a computing device may be monitored for an application that has a preferred latency mode, and the request for a predetermined latency mode and/or the display for a manual latency mode may be triggered by a detection of such an application. In alternate embodiments, the modem and/or interface 104 may perform a packet inspection (e.g., packet type inspection, packet payload inspection, etc.) and automatically reconfigure its latency mode for any particular MAC address and/or channel combination based on the type of traffic being sent at any particular instance in time. In these embodiments, the packet inspection (e.g., packet type inspection, packet payload inspection, etc.) may occur, for example, in the interface 104 and/or in a modem and/or home gateway.

Unlike QoS priority systems, a change in buffer size associated with an individual MAC address and/or channel has no impact on other users of the system and/or overall complexity of the system. The change of buffer size may be implemented on the interface 104 with no impact on other users and/or the overall interface 104. Termination systems in accordance with embodiments include an interface that allows a user, modem, a user device at premises 102(a), and/or application to request a change in buffer size. Thus, interface 104s described herein dynamically set buffer size associated with, for example, a MAC address and/or channel, based upon requests and/or feedback from an customer premises device and/or analysis of traffic coming from a customer premises device.

In still further embodiments, the latency mode allows for additional revenue models associated with high bandwidth services. For example, certain users such as gamers may pay a premium to be able to have the highest scores in interactive on-line gaming. Gamers may well pay, for example, a premium (e.g., $5/month) for the ability to have much less latency when playing their desired game. These users may be provided with a competitive advantage over other users.

In still further embodiments, the low latency mode may be replicated in other network equipment beyond the interface 104 such as throughout the internal and external routers between the customer premises equipment and/or the server. For example, the API request for a low latency mode (e.g., gaming mode) may be built into the routers operating system such as Junos, IOS and/or NX. In this manner, the request for a low latency connection may be forwarded and replicated across the entire network path between the customer premises equipment and the server (e.g., a gaming server).

In still further embodiments, the latency mode may be reset to a default mode automatically after a predetermined period of time. This default mode may be user defined and/or determined by the interface 104, a user device at premises 102(a), user, modem, and/or home gateway.

Embodiments of described herein may easily be added to every modem, interface 104 (e.g., CMTS), router, and/or other network and/or server device. By defining appropriate API's and requesting that vendors implement the APIs to implement latency modes in accordance with the embodiments herein, these features become universally available across the entire network vastly improving the user experience.

In still further embodiments, latency across a network (e.g., packet switched and/or MPLS network) can vary with frame size. For example, where smaller frames are utilized such as an 86 byte frame, latency may be as small as 0.025 seconds. However, as frame and throughput increases, latency may also increase. For example, when using a frame size of 1518 bytes, latency may be 10 times as much such as 0.25 s across each router.

In still further embodiments, interface 104 may be configured to request a smaller packet size in situations where low latency has been requested. For example, by using the Packet Too Big message in IPv6, the interface 104 may cause the IPv6 protocol stack in a user device at premises 102(a) to output smaller packet sizes, thus resulting in lower overall latency across the entire packet network and/or Internet. In these embodiments, the processor in the interface 104 may utilize both buffer size and permitted packet size to decrease latency.

Although example embodiments are described above, the various features and steps may be combined, divided, omitted, and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

I claim:

1. A method comprising:
receiving, by a computing device and based on content of packets associated with an application executing on a user device, a first latency mode associated with the application;
determining, by the computing device and based on the first latency mode, a buffer size for a buffer of a plurality of buffers, wherein the buffer is associated with the user device, and wherein the buffer is configured to store data to be sent to the user device or data received from the user device;
adjusting, based on the determined buffer size, a current size of the buffer; and
sending, based on the adjusting the current size of the buffer and to the user device, a notification indicating a change in latency mode.

2. The method of claim 1, wherein:
the determining the buffer size is further based on a comparison of the first latency mode and a second latency mode, of a plurality of latency modes, associated with the user device.

3. The method of claim 1, wherein:
the application comprises one or more of: a video game application, a real-time communication application, or an internet protocol telephony application.

4. The method of claim 1, wherein the determining the buffer size for the buffer is further based on a connection preference associated with the change in a latency mode.

5. The method of claim 1, wherein the determining the buffer size for the buffer is further based on a subscription package associated with the user device.

6. The method of claim 1, wherein the determining the buffer size for the buffer is further based on an identification of one or more channels designated for the user device.

7. The method of claim 1, wherein the computing device comprises one or more of: a termination system, a router, a network gateway, or a network switch.

8. An apparatus comprising:
one or more processors; and
memory storing instructions that, when executed by the one or more processors, cause the apparatus to:
determine, based on content of packets associated with an application executing on a user device, a first latency mode associated with the application;
determine, based on the first latency mode, a buffer size for a buffer of a plurality of buffers, wherein the buffer is associated with the user device, and wherein the buffer is configured to store data to be sent to the user device or data received from the user device;
adjust, based on the determined buffer size, a current size of the buffer; and
send, based on the adjusting the current size of the buffer and to the user device, a notification indicating a change in latency mode.

9. The apparatus of claim 8, wherein:
the instructions, when executed by the one or more processors, cause the apparatus to determine the buffer size for the buffer further based on a comparison of the first latency mode and a second latency mode, of a plurality of latency modes, associated with the user device.

10. The apparatus of claim 8, wherein:
the application comprises one or more of: a video game application, a real-time communication application, or an internet protocol telephony application.

11. The apparatus of claim 8, wherein the instructions, when executed by the one or more processors, cause the apparatus to determine the buffer size for the buffer further based on a connection preference associated with the change in latency mode.

12. The apparatus of claim 8, wherein the instructions, when executed by the one or more processors, cause the apparatus to determine the buffer size for the buffer further based on a subscription package associated with the user device.

13. The apparatus of claim 8, wherein the instructions, when executed by the one or more processors, cause the apparatus to determine the buffer size for the buffer further based on an identification of one or more channels designated for the user device.

14. The apparatus of claim 8, wherein the apparatus comprises one or more of a termination system, a router, a network gateway, or a network switch.

15. An apparatus comprising:
one or more processors; and
memory storing instructions that, when executed by the one or more processors, cause the apparatus to:
receive a connection preference associated with a change in latency mode for a user device;
determine, based at least on the user device, a buffer of a plurality of buffers, wherein the buffer is associated with the user device, and wherein the buffer is configured to store data to be sent to the user device or data received from the user device;

determine, based at least partially on the change in latency mode, the connection preference, and network traffic between the apparatus and the user device, a buffer size for the buffer; and adjust, based on the determined buffer size, a size of the buffer.

16. The apparatus of claim 15, wherein the instructions, when executed by the one or more processors, cause the apparatus to determine the buffer size by determining, based on the connection preference being associated with a reduction in a current latency mode of the user device, a reduction in the buffer size for the buffer.

17. The apparatus of claim 15, wherein predetermined buffer sizes are associated with latency modes of the user device.

18. The apparatus of claim 15, wherein the user device comprises a modem.

19. The apparatus of claim 15, wherein the instructions, when executed by the one or more processors, cause the apparatus to determine the buffer size for the buffer further based on a subscription package associated with the user device.

20. The apparatus of claim 15, wherein the instructions, when executed by the one or more processors, cause the apparatus to determine the buffer further based on an identification of one or more channels designated for the user device.

21. The apparatus of claim 15, wherein the instructions, when executed by the one or more processors, cause the apparatus to receive the connection preference by receiving modulated signals, via the one or more channels, from the user device.

22. The apparatus of claim 15, wherein the apparatus comprises one or more of: a termination system, a router, a network gateway, or a network switch.

23. A method comprising:

receiving, by a computing device associated with a plurality of buffers, a connection preference associated with a change in latency mode for a user device;

determining, based at least on the user device, a buffer of the plurality of buffers, wherein the buffer is associated with the user device, and wherein the buffer is configured to store data to be sent to the user device or data received from the user device;

determining, at least partially based on the change in latency mode, the connection preference, and network traffic between the computing device and the user device, a buffer size for the buffer; and adjusting, based on the determined buffer size, a size of the buffer.

24. The method of claim 23, wherein:

the user device has a current latency mode of a plurality of latency modes;

the connection preference is associated with a reduction in latency; and the determining the buffer size comprises determining a reduction in the buffer size for the buffer.

25. The method of claim 24, wherein each latency mode of the plurality of latency modes has an associated predetermined buffer size.

26. The method of claim 23, wherein the user device comprises a modem.

27. The method of claim 23, wherein the determining the buffer size for the buffer is further based on a subscription package associated with the user device.

28. The method of claim 23, wherein the determining the buffer is further based on an identification of one or more channels designated for the user device.

29. The method of claim 28, wherein the receiving the connection preference comprises receiving modulated signals, via one or more channels, from the user device.

30. The method of claim 23, wherein the computing device comprises one or more of: a termination system, a router, a network gateway, or a network switch.

31. The method of claim 23, wherein:

the user device has a current latency mode of a plurality of latency modes;

the connection preference is associated with an increase in latency; and the determining the buffer size comprises determining an increase in the buffer size for the buffer.

32. The method of claim 31, wherein each latency mode of the plurality of latency modes has an associated predetermined buffer size.

33. The apparatus of claim 15, wherein the network traffic between the apparatus and the user device comprises network traffic from the user device.

34. The method of claim 23, wherein the network traffic between the computing device and the user device comprises network traffic from the user device.

35. The method of claim 1, wherein the determining the buffer size comprises one of:

determining, based on an increased latency associated with the first latency mode, an increase in the buffer size; or determining, based on a decreased latency associated with the first latency mode, a decrease in the buffer size.

36. The apparatus of claim 8, wherein the instructions, when executed by the one or more processors, cause the apparatus to determine the buffer size by performing one of:

determining, based on an increased latency associated with the first latency mode, an increase in the buffer size; or determining, based on a decreased latency associated with the first latency mode, a decrease in the buffer size.

37. The method of claim 23, wherein the determining the buffer size comprises one of:

determining, based on an increased latency associated with the change in latency mode, an increase in the buffer size; or determining, based on a decreased latency associated with the change in latency mode, a decrease in the buffer size.

38. The method of claim 1, further comprising:

receiving, by the computing device, identification information of the application, wherein the determining the first latency mode comprises determining, based on the content of the packets and based on the identification information, the first latency mode associated with the application.

39. The method of claim 1, wherein the content of the packets comprises information indicating one or more types of the packets.

40. The apparatus of claim 15, wherein the instructions, when executed by the one or more processors, cause the apparatus to determine the buffer size by determining, based on the connection preference being associated with an increase in a current latency mode of the user device, an increase in the buffer size for the buffer.

41. The method of claim 1, further comprising: causing output, via the user device, of the notification, wherein the notification indicates the change in latency mode from a second latency mode, of a plurality of latency mode, associated with the user device, to the first latency mode.

42. One or more non-transitory computer-readable media storing instructions that, when executed by one or more processors, cause:
   receiving, based on content of packets associated with an application executing on a user device, a first latency mode associated with the application;
   determining, based on the first latency mode, a buffer size for a buffer of a plurality of buffers, wherein the buffer is associated with the user device, and wherein the buffer is configured to store data to be sent to the user device or data received from the user device;
   adjusting, based on the determined buffer size, a current size of the buffer; and
   sending, based on the adjusting the current size of the buffer and to the user device, a notification indicating a change in latency mode.

43. The one or more non-transitory computer-readable media of claim 42, wherein the
   the determining the buffer size is further based on a comparison of the first latency mode and a second latency mode, of a plurality of latency modes, associated with the user device.

44. The one or more non-transitory computer-readable media of claim 42, wherein the application comprises one or more of: a video game application, a real-time communication application, or an internet protocol telephony application.

45. The one or more non-transitory computer-readable media of claim 42, wherein the determining the buffer size for the buffer is further based on a connection preference associated with the change in latency mode.

46. The one or more non-transitory computer-readable media of claim 42, wherein the determining the buffer size for the buffer is further based on a subscription package associated with the user device.

47. The one or more non-transitory computer-readable media of claim 42, wherein the determining the buffer size for the buffer is further based on an identification of one or more channels designated for the user device.

48. The one or more non-transitory computer-readable media of claim 42, wherein the one or more processors are associated with one or more of: a termination system, a router, a network gateway, or a network switch.

49. One or more non-transitory computer-readable media storing instructions that, when executed by one or more processors, cause:
   receiving a connection preference associated with a change in latency mode for a user device;
   determining, based at least on the user device, a buffer of a plurality of buffers, wherein the buffer is associated with the user device, and wherein the buffer is configured to store data to be sent to the user device or data received from the user device;
   determining, based at least partially on the change in latency mode, the connection preference, and network traffic between a computing device and the user device, a buffer size for the buffer; and
   adjusting, based on the determined buffer size, a size of the buffer.

50. The one or more non-transitory computer-readable media of claim 49, wherein
   the user device has a current latency mode of a plurality of latency modes;
   the connection preference is associated with a reduction in latency; and
   the determining the buffer size comprises determining a reduction in the buffer size for the buffer.

51. The one or more non-transitory computer-readable media of claim 50, wherein each latency mode of the plurality of latency modes has an associated predetermined buffer size.

52. The one or more non-transitory computer-readable media of claim 49, wherein the user device comprises a modem.

53. The one or more non-transitory computer-readable media of claim 49, wherein the determining the buffer size for the buffer is further based on a subscription package associated with the user device.

54. The one or more non-transitory computer-readable media of claim 49, wherein the determining the buffer is further based on an identification of one or more channels designated for the user device.

55. The one or more non-transitory computer-readable media of claim 54, wherein the receiving the connection preference comprises receiving modulated signals, via the one or more channels, from the user device.

56. The one or more non-transitory computer-readable media of claim 49, wherein the computing device comprises one or more of: a termination system, a router, a network gateway, or a network switch.

57. The one or more non-transitory computer-readable media of claim 49, wherein
   the user device has a current latency mode of a plurality of latency modes;
   the connection preference is associated with an increase in latency; and
   the determining the buffer size comprises determining an increase in the buffer size for the buffer.

58. The one or more non-transitory computer-readable media of claim 57, wherein each latency mode of the plurality of latency modes has an associated predetermined buffer size.

59. The one or more non-transitory computer-readable media of claim 49, wherein the network traffic between the computing device and the user device comprises network traffic from the user device.

60. The one or more non-transitory computer-readable media of claim 49, wherein the instructions, when executed by the one or more processors, cause the determining the buffer size by causing one of:
   determining, based on an increased latency associated with the change in latency mode, an increase in the buffer size; or
   determining, based on a decreased latency associated with the change in latency mode, a decrease in the buffer size.

* * * * *

UNITED STATES PATENT AND TRADEMARK OFFICE
CERTIFICATE OF CORRECTION

| | | |
|---|---|---|
| PATENT NO. | : 11,038,820 B2 | Page 1 of 1 |
| APPLICATION NO. | : 15/388932 | |
| DATED | : June 15, 2021 | |
| INVENTOR(S) | : Anthony Manuel Veiga | |

It is certified that error appears in the above-identified patent and that said Letters Patent is hereby corrected as shown below:

In the Claims

Column 20, Line 6:
In Claim 29, after "via", please insert --the--

Column 20, Line 51:
In Claim 38, after "wherein the", please replace "determining" with "receiving"

Column 21, Line 20:
In Claim 43, after "wherein", please delete "the"

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*